United States Patent [19]

Baduel

[11] Patent Number: 4,508,555
[45] Date of Patent: Apr. 2, 1985

[54] METHOD AND APPARATUS FOR SCRUBBING EFFLUENT GASES FROM MINERAL FIBER PRODUCTION

[75] Inventor: Guy M. Baduel, Terrasson, France

[73] Assignee: Isover Saint-Gobain, Paris, France

[21] Appl. No.: 583,795

[22] Filed: Mar. 1, 1984

Related U.S. Application Data

[63] Continuation of Ser. No. 366,556, Apr. 8, 1982, abandoned.

[51] Int. Cl.³ .................. C03C 25/02; C03B 37/06
[52] U.S. Cl. ............................... 65/3.43; 55/84;
55/220; 65/2; 65/3.44; 65/11.1; 261/78 A; 261/118
[58] Field of Search ............... 55/84, 220; 261/118, 261/78 A; 65/2, 3.43, 3.44, 11.1

[56] References Cited

U.S. PATENT DOCUMENTS

| 4,028,071 | 6/1977 | Langlois | 55/89 |
| 4,052,183 | 10/1977 | Levecque et al. | 65/3.43 |
| 4,105,424 | 8/1978 | Levecque et al. | 65/3.43 |
| 4,111,672 | 9/1978 | Battigelli et al. | 65/3.43 |
| 4,260,563 | 4/1981 | Brulhet | 261/115 X |
| 4,263,007 | 4/1981 | Battigelli et al. | 425/371 |

FOREIGN PATENT DOCUMENTS

| 2278379 | 2/1976 | France . |
| 1476265 | 6/1977 | United Kingdom . |
| 1524779 | 9/1978 | United Kingdom . |

Primary Examiner—Robert Lindsay
Attorney, Agent, or Firm—John T. Synnestvedt; Richard D. Weber

[57] ABSTRACT

Method and apparatus are disclosed for scrubbing effluent gases arising during the production of mineral fibers and particularly during the production of glass fiber insulation blankets or mats. The scrubbing is effected by the use of opposed jets of water, the interaction of which produces a planar dispersion of water droplets across the path of the effluent gases. The jets are preferably located within the gas collecting ducts closely adjacent the region of gas emergence to prevent buildup of glass fibers and binder on the duct walls. The water is separated from the gas, following which the water and gas are both subjected to further treatment before being recycled or released.

21 Claims, 8 Drawing Figures

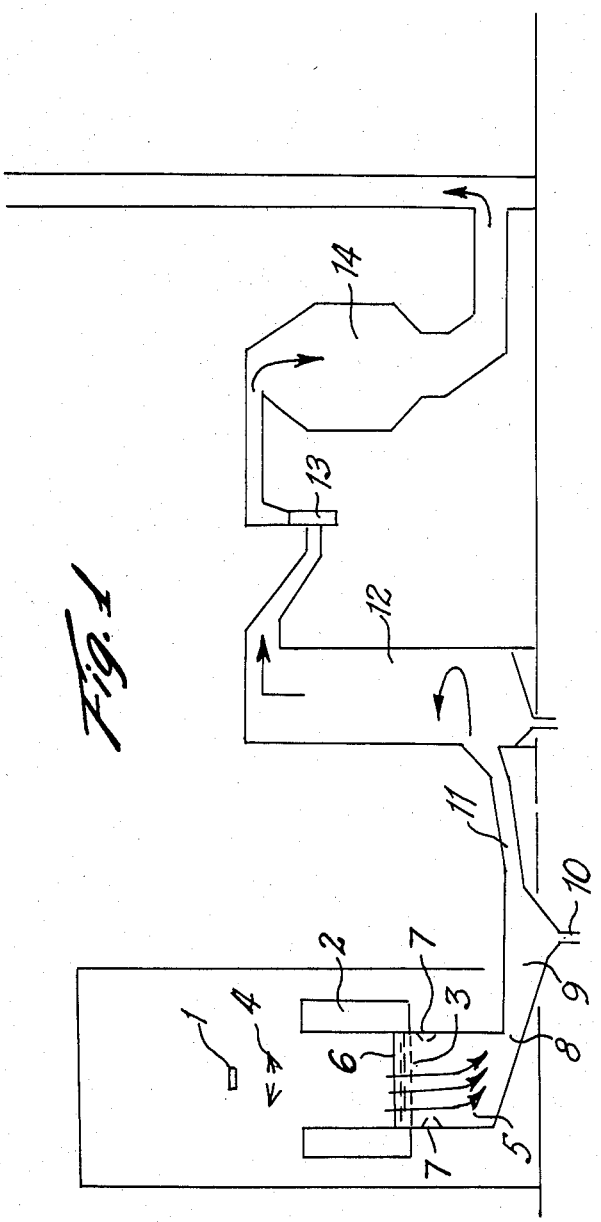

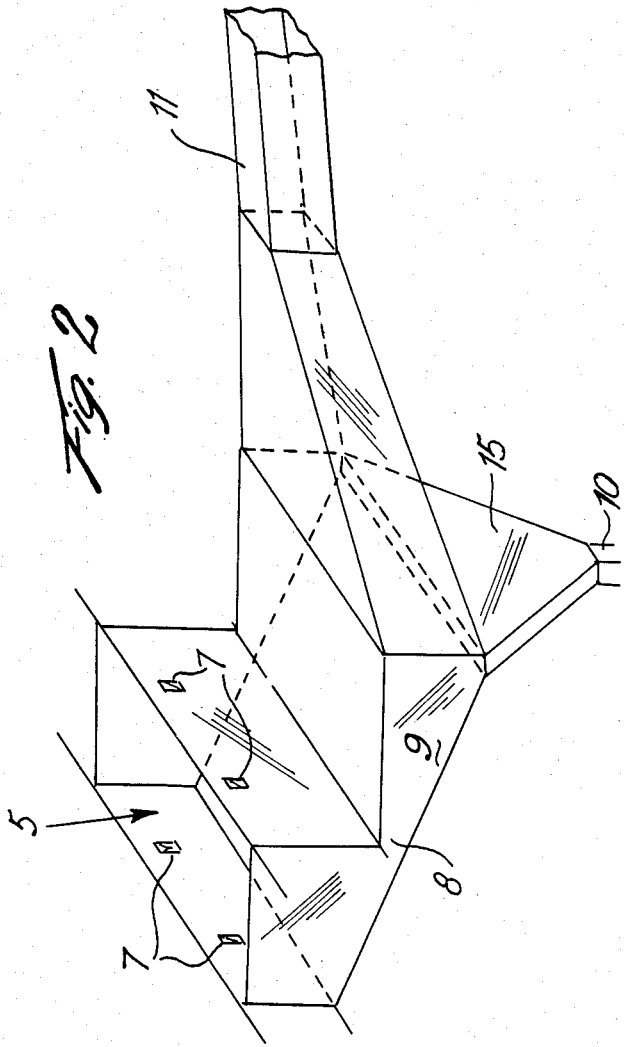

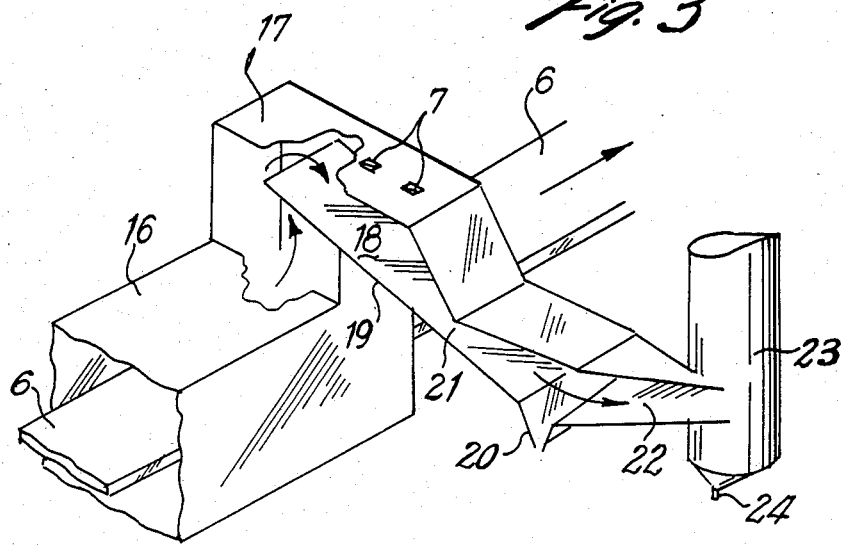
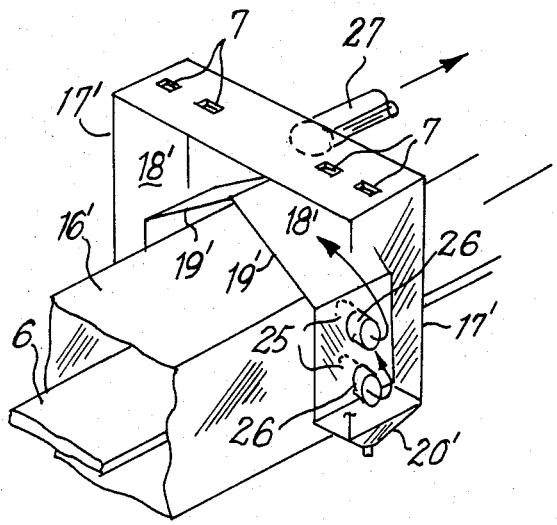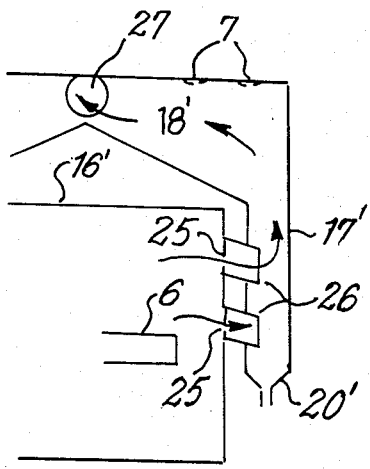

METHOD AND APPARATUS FOR SCRUBBING EFFLUENT GASES FROM MINERAL FIBER PRODUCTION

CROSS REFERENCE TO RELATED APPLICATIONS

This application is a continuation of application Ser. No. 366,556 filed Apr. 8, 1982 now abandoned.

BACKGROUND AND STATEMENT OF OBJECTS

The present invention relates generally to the manufacture of mineral fibers, such as glass fibers, and relates more particularly to the scrubbing of effluent gases arising during the production of mineral fiber blankets, mats or boards.

The manufacture of mineral fiber insulation products conventionally includes as one of a series of operations, the step of forming a blanket or mat of fibers which then undergoes further treatment and transformation into various types of products. During the initial formation of the blanket, as well as during the subsequent treatment and transformation steps, substantial quantities of effluent gases are developed which require treatment because of entrained polluting elements.

In the formation of the fiber blanket, the newly formed fibers are typically carried by gas currents onto a foraminous conveyor moving transversely to the direction of gas and fiber flow, the gas passing through the conveyor while the fibers accumulate on the conveyor surface in the form of a blanket of substantial thickness. In the conventional process, a binder spray is directed onto the fibers prior to their collection on the conveyor.

Since the gases passing through the conveyor contain binder either in vapor or droplet form as well as some fibers and mineral particles which have passed through the conveyor, it is necessary to provide means for scrubbing these gases before their recycling or release into the atmosphere, especially since the binder formulation can be quite toxic as can the degradation products which are formed when the binder comes in contact with the high temperature fibers.

Although the gases described resulting from the fiber blanket laydown are a principal source of effluent gases requiring scrubbing in a mineral fiber production system, other operations also produce gaseous effluents which require treatment. Principally, these include the treatment of the blanket to cure the binder, which treatment stage normally includes a curing oven possibly followed by a cooling treatment, and subsequent transformation operations wherein the blanket is for example combined with other elements to form a laminated structure, treated with additional compositions, combined with facing sheets, cut into predetermined lengths, etc. Many of these subsequent treatment and transformation operations are sources of effluent gases which require scrubbing, particularly those involving heating or cooling flows of air, spraying of compositions, or cutting operations which might typically include sawing, slicing or severing by means of high pressure air blasts.

The present invention has accordingly been developed to treat the effluent gases arising from various types of mineral fiber production operations. The effluent gases, whether resulting from the fiber blanket formation region or subsequent treatment or transformation steps, usually includes a combination of particulate solids such as unfiberized mineral fragments, broken or cut fibers, and in addition chemical compositions such as the binder spray which may be either in gaseous or droplet form. This combination of binder droplets or vapors and fibers or fiber fragments not only create a need for a thorough scrubbing of the gases but furthermore creates a problem within the chambers and ducts through which the effluent gases pass. The binder tends to form adhesive deposits which retain the entrained fibers or fragments resulting in a buildup of deposits on the chamber and duct walls. Such buildup of deposits is quite rapid and requires the periodic stoppage of the process to permit their removal. Not only do such stoppages result in lost production of fibrous material, but the removal of the deposits is itself a laborious and costly operation. The occurrence of such deposits is thus a significant factor in terms of production costs of fiber.

The conventional approach to treating the effluent gases has been a passage of the gases through atomized water sprays for the purpose of cooling and initially removing a large amount of the polluting elements. In particular, an effort has been made to remove as much binder as possible by this water atomization to prevent the fouling of the chamber and duct walls. Difficulties are however encountered in effectively implementing the water atomization.

A first difficulty results from the extremely large quantity of gas circulating through the typical installation and, consequently, with the dimensions of the installation within which the scrubbing operations must be conducted. In U.S. Pat. No. 4,111,672, some values of gas volumes are indicated, characteristic of different modes of fiber production. These values are on the order of $0.1 \times 10^6$ to $1 \times 10^6$ m$^3$/hr. of effluent gas for the operations resulting in the formation of the fiber blanket. As described below, it is difficult to obtain a fine, homogeneous dispersion of the atomized water on such large volumes while using conventional atomizing techniques.

A second difficulty in implementing effluent gas scrubbing by water atomization arises from the need to prevent the formation of deposits on the path of the gases as soon as the gases have passed into the gas evacuating chamber or duct. With respect to the gases flowing from the fiber blanket forming area, the deposits must be prevented immediately beneath the conveyor. Otherwise the deposits will modify the passage section and consequently the flow of the gases across the blanket being formed. Such modification would interfere with the homogeneity of the fiber blanket. The problem of deposit prevention is further increased by the constraint that the water projected during the scrubbing operation cannot be permitted to reach the fiber blanket.

A third difficulty arises from the fact that the water used, which becomes saturated with polluting elements, cannot be discarded. It is therefore conventional to recycle the water after it has been cleansed of at least a portion of the entrained polluting elements. In order for the cost to be acceptable, the water cleansing operation must be relatively simple, for example, a summary filtration or a similar operation. Following such treatment, the recycled water ordinarily still contains a substantial quantity of materials in suspension as well as stable or unstable dissolved products.

In the conventional scrubbing process used with mineral fiber production systems, the atomization of the water is effected by passing the water under pressure through nozzles having relatively small dimensions. This method, however, suffers several serious disadvantages. First, the quantity of water distributed by each atomizing nozzle and the area effectively treated by the atomization from each nozzle are necessarily quite limited because of the small nozzle dimensions. Although it is possible to increase the number of nozzles, it is nevertheless difficult to attain a complete continuity and good homogeneity of the layer of water droplets throughout the entire area tranversed by the gases. In practice, even with a large number of nozzles of this type, it is not possible to effectively treat all of the gas flow and, consequently, to prevent the formation of deposits on the walls of the chambers or ducts.

Secondly, because of the nozzle dimensions, frequent cloggings of the nozzles are experienced, especially as the recycled water becomes more saturated with polluting elements. Therefore even a good arrangement of the nozzles in the atomizing area cannot guarantee a continually homogeneous atomization. Furthermore, the nozzle cloggings require frequent interruptions of the process for reconditioning of the nozzles.

Thirdly, the nature of the trajectory of the atomized water from the conventional nozzle makes it difficult to position the nozzles close to the fiber blanket receiving conveyor because of the danger of the water reaching the fiber blanket. The conventional nozzle array is accordingly located at some distance from the conveyor and directed away from the conveyor, thus providing an opportunity for deposits to develop on the chamber walls immediately adjacent the conveyor.

In an effort to overcome these difficulties, the conventional nozzles were replaced by an apparatus in which the water dispersion is obtained by projection onto a concave curved element. A water jet directed onto such element forms a liquid layer which widens and bursts into a multitude of droplets.

There are several drawbacks to such a method of atomization. A first difficulty is that very fine droplets can only be produced with relatively low output. Secondly, there is a rapid wearing of the water dispersion element because of the abrasive particles in the water. Deterioration of the polished surface of the dispersion elements take place rapidly and within a few days, the erosion-corrosion of the elements causes the deformation thereof and causes the elements to become less efficient. It is usually necessary to replace the elements after two weeks of continuous operation.

In view of the foregoing difficulties with existing systems for scrubbing effluent gases from mineral fiber production facilities, the following objectives of the invention can be appreciated.

A first object of the present invention is to provide a scrubbing of the effluent gases arising from mineral fiber production which prevents the formation of deposits on the walls of the chambers and ducts through which the gases pass.

Another object of the invention is to provide, in connection with the gases passing through the fiber receiving conveyor, an arrangement for scrubbing the gases immediately beneath the conveyor without the atomizing water reaching the conveyor in order to maintain the cleanliness of the walls in this region.

Still another object of the invention is to provide an extremely homogeneous water dispersion within the chambers and ducts through which the effluent gases flow, even when the chambers and ducts are of large size.

Another object of the invention is to provide a scrubbing of gaseous effluents from mineral fiber production installations which provides a good efficiency of removal of the polluting products carried by the effluent gases.

Still another object of the invention is to provide means for producing atomization of water which is capable of operation even with water containing abrasive particles during prolonged usage without effecting operation.

A still further object of the invention is to provide means for atomization of water which is operative even if accidentally saturated with relatively voluminous corpuscles without blockage of the atomizing means.

Still another object of the invention is to provide a scrubbing means as described for effluent gases which may be utilized to scrub effluent gases arising from all of the steps of the production process.

BRIEF SUMMARY OF THE INVENTION

The present invention obtains the above objectives by the utilization, in the scrubbing of effluent gases from mineral fiber manufacturing processes, a water atomization created by the colliding interaction of two jets of water directed toward each other, which jets produce an atomized sheet of water extending transversely to the path of the effluent gases. It has been found that the collision of two jets of water produces an expanded layer of droplets in comparison to those produced by conventional means with a resultant dispersion of the droplets over large areas without discontinuity in the spacial distribution of the droplets. This represents a substantial advantage over prior modes of atomization since, even when the treatment is carried out in very large chambers, it is possible to use only a small number of the jets. By selecting suitable parameters for the collision jets and their location, the entire cross section of the chambers through which the effluent gases pass can be covered without difficulty.

Ordinarily the form of the layer droplet developed by the jets does not exactly correspond to that of the chamber section, and some of the water is accordingly projected on the chamber walls. The walls in the impact zone of the droplets are in this way "scoured" by the continuous water flow. To obtain this cleaning action of the walls, however, it is not necessary that the impact be forceful.

It has furthermore been found from operating experience that the washing of the effluent gases by means of homogeneous water dispersion produced by jet collision results in very clean walls, even beyond the impact zone of the water projected by the jets.

The nature of the sheet or layer of water produced by the collision jets, which is essentially planar, permits the location of the jets very closely beneath the fiber blanket conveyor and accordingly prevents any buildup of deposits on the chamber walls immediately beneath the conveyor.

Since the jets utilized in producing the collision jet atomization need not have small passages, the risk of clogging of the jets is greatly reduced in comparison with that of conventional devices and hence the need for interruption of the operation in order to service the jets is extremely infrequent.

BRIEF DESCRIPTION OF THE DRAWINGS

FIG. 1 is a schematic elevational view of part of an installation for the treatment of gases arising from the formation of mineral fibers in accordance with the invention;

FIG. 2 is a schematic perspective view of the scrubbing zone downstream of the fiber collecting conveyor;

FIG. 3 is a schematic perspective view of gas scrubbing apparatus according to the invention applied to an apparatus for treating a mineral fiber blanket, such as an oven;

FIG. 4 is a schematic view similar to that of FIG. 3 showing still another embodiment of the gas scrubbing means;

FIG. 5 is a partial transverse sectional view of the apparatus of FIG. 4 showing details of the connections between the chamber for treating of the fiber blanket and the means for scrubbing the gases.

DESCRIPTION OF THE PREFERRED EMBODIMENT

Figure 1A:
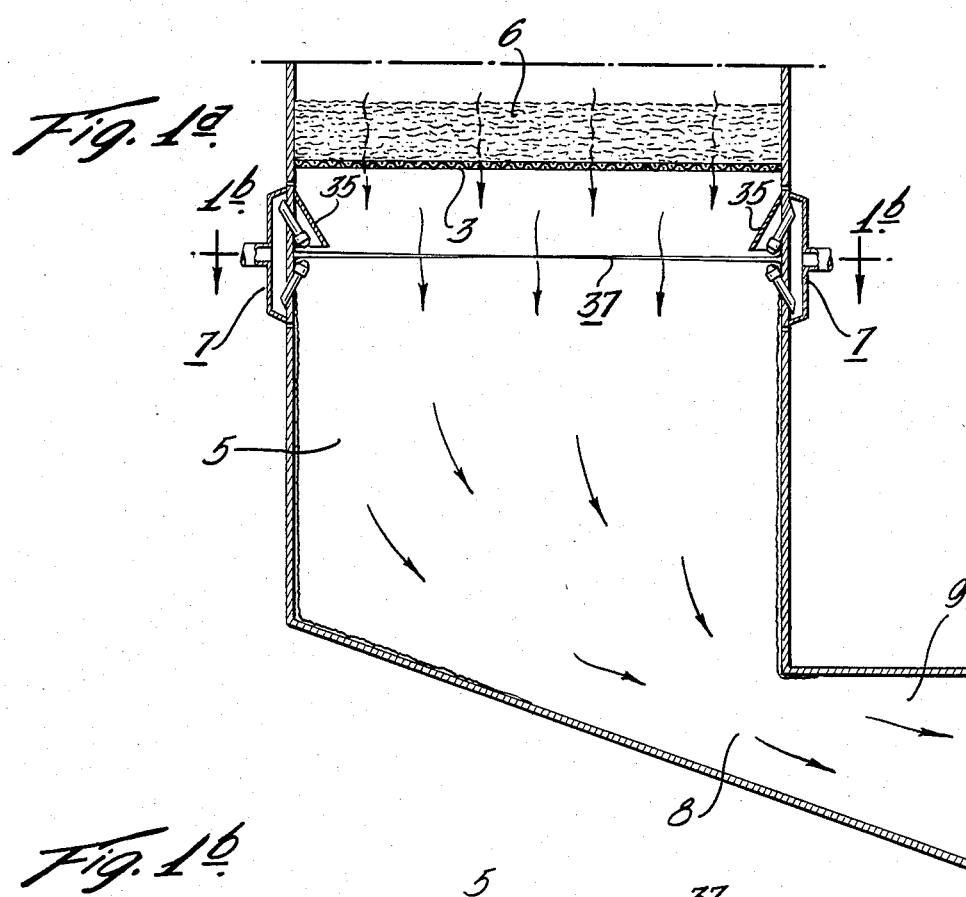
FIG. 1a is an enlarged sectional view of the lower left hand portion of the installation shown in FIG. 1.

Referring to the drawings and particularly FIG. 1 thereof, an apparatus is illustrated for the production of mineral fibers, the formed fibers being collected on a conveyor to form a blanket or mat. A series of chambers and ducts, through which the gas aspirated through the conveyor circulates, is located beneath and adjacent this installation.

Specifically, the apparatus for the formation of fibers, for example of the centrifuge type, is shown schematically at 1. This apparatus produces an annular flow of fibers, the attenuation of which is completed by a downwardly directed hot annular gas blast. The combination of this blast and the induced air currents from the atmosphere is directed toward a forming hood with movable walls 2. A foraminous conveyor 3 located in the lower part of this hood and extending along the entire width thereof constitutes a fiber receiving surface.

The fibers are sprayed with a binder composition which is atomized into the path of the fibers between the fiber forming element and the receiving surface by an atomizing means schematically represented at 4.

A chamber 5 constituting a gas scrubbing chamber is located beneath the conveyor 3 and is maintained at a pressure below that of the forming hood so that the gases pass from the hood through the fiber blanket 6 and the conveyor 3 into the chamber 5.

Collision jet injector assemblies 7 are disposed on the walls of the scrubbing chamber 5 directly beneath the conveyor. The operating characteristics of the injector assemblies 7 are chosen to produce a sheet or layer of atomized water droplets extending across the entire width of the scrubbing chamber 5 to intercept and totally saturate the gas mass passing downwardly therethrough. The details of the injector assemblies and their operation are discussed below in conjunction with the description of FIGS. 1a and 1b.

The chamber 5 is connected by a passage 8 with a chamber 9. The passage 8, being of smaller cross section, provides an acceleration of the gases and produces a redispersion of the water running down from the walls of chamber 5, thus completing the scrubbing process. Upon entering the chamber 9, the gases are slowed by the larger volume of the chamber and the large droplets in suspension are precipitated onto the floor of the chamber and are evacuated through a conduit 10.

The scrubbed gases are directed through a duct 11 to a separating apparatus 12 of the cyclone type. The entrained fine droplets are centrifugally removed from the gases in the cyclone and are recovered in the lower part thereof, while the cleansed gases are drawn from the upper part of the cyclone by a blower 13. The blower assures the maintenance of a reduced pressure in the chamber 5 and the progression of the gases through the portion of the apparatus situated downstream of the conveyor.

When very fine droplets are present in the gases, it may be advantageous to provide a further separation stage by passing the gases through an ultrafiltration apparatus as shown at 14.

In the system described above, the gases are released into the atmosphere. It is also possible, as described in French patent application Nos. 2,247,346, 2,318,121 and 2,368,445, to recycle a part of the gas flow. In such case, the recycled gas is taken, for example, at the exit of the blower 13 and returned to the chamber wherein the fiber formation is carried out.

The water recovered at various points of this system is conducted to decanters. The system of water conduits and the water treatment means are conventional systems and are thus not shown in the schematic view of FIG. 1.

A complete installation of the type schematically illustrated in FIG. 1 usually comprises several fiber forming apparatus, aligned beneath a fore-hearth from which the molten fiberizing material flows. The conveyor 3 is disposed beneath and in alignment with the series of fiber forming apparatus. Because of the limited capacity of commercially available elements, it is ordinarily necessary to utilize several units such as described above, including the chamber 5, chamber 9, cyclone 12, ventilator 13 etc., in order to insure the proper circulation of the gases.

Figure 1B:
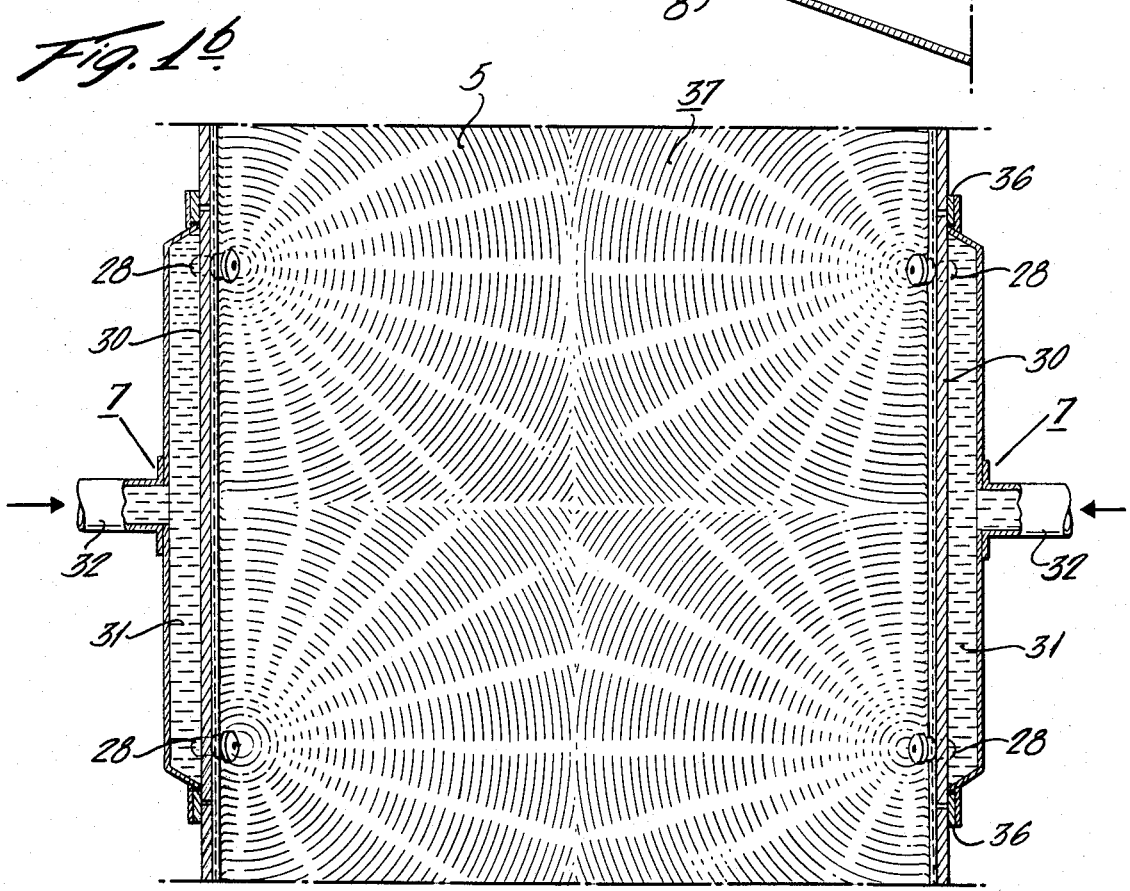
FIG. 1b is a sectional plan view taken along line 1b—1b of FIG. 1a and showning the atomization pattern of the collision jets.

The gas scrubbing arrangement of the installation shown in FIG. 1 is shown in greater detail in FIGS. 1a, 1b and 2. Although these views illustrate the details with respect to a single scrubbing chamber 5, it should be understood that the chamber 5 represents only one of a series of similar chambers extending along the production line beneath the conveyor 3.

As shown in FIGS. 1a and 1b and schematically in FIG. 2, the injector assemblies 7 are mounted on the vertical walls of the scrubbing chamber 5 in the upper part of the chamber close to the conveyor 3. The injector assemblies include pairs of blast pipes and nozzles 7 mounted in symmetrical relation, each pair being disposed with their axes in a common vertical plane extending transverse to the conveyor. The blast pipes and nozzles communicate with a feed chamber or manifold 31 into which pressurized water is introduced by means of the conduit 32. For convenience of assembly, the blast pipes may be mounted on a demountable plate 30 which serves as a portion of the chamber wall.

The collision of the jets of water issuing from the injectors creates a sheet or layer of water 37 extending essentially horizontally across the chamber 5, the plane of the water layer being essentially perpendicular to the plane of each pair of nozzles. The injectors are angularly disposed to the vertical chamber walls so that the atomized water layer issues principally outwardly from the injectors to produce the atomization patterns shown schematically in FIG. 1b. A portion of the atomized water layer impinges on the walls of the chamber and runs down the walls as shown in FIG. 1a creating a cleansing of the walls in the process.

In order to prevent any splashing of the collision jets from reaching the fiber blanket on the conveyor as well as to prevent any possibility of the lowermost jet spraying the conveyor in the event of malfunction of the uppermost jet, conical deflector plates 35 are fastened on the walls of the chamber above each pair of blast pipes but clear of the atomized water layer 37.

As shown in FIG. 2, the chamber 5 and the adjacent chamber 9 are connected along their length, the connection zone being formed by the passage 8. The bottom of the chambers 5 and 9 slope continuously toward the collector 15 to funnel the collected water into the duct 10.

In the form of the invention shown in FIG. 3, apparatus is illustrated including chambers for evacuation and scrubbing of gases coming from an apparatus for treating a fiber blanket, specifically an oven for hardening the resins forming the binder. The treating apparatus could alternately comprise an assembly for cooling of the blanket by circulation of air at room temperature. In another embodiment, the treating apparatus could comprise means for aspirating the dust particles formed, for example, from the cutting of the fiber blanket. Each of these treating apparatus are characterized by a gas current saturated with polluting elements, which current must be scrubbed prior to recycling or release into the atmosphere.

In the embodiment of FIG. 3, the fiber blanket treatment is carried out within a closed chamber 16, only a part of which is shown. The fiber blanket or mat 6 passes through this chamber on the conveyor. To simplify the view, the treatment means is not shown. In an oven, for example, there would be apparatus providing a forced circulation of hot gases across the fiber blanket or mat. Such apparatus is described in particular in French patent application No. 2,394,041.

The polluted gases formed during the treatment pass from the chamber 16 to a direction changing chamber 17 communicating with the upper part of the chamber 16, and then into the scrubbing chamber 18. To provide a better pictorial representation, the side wall of the chambers connecting the gases are removed in FIG. 3.

The positions of two injector assemblies 7, which are identical to those shown in FIGS. 1-2 and are hence shown schematically, are indicated on the upper wall of the scrubbing chamber 18. These injectors with converging jets are arranged so that the layers of droplets formed thereby extend transversely to the path of the gases. Deflector plates such as those shown in FIG. 2a are preferably provided to prevent any accidental projection of water toward the chamber 17. The number, position and characteristics of the injectors used are, of course, selected in accordance with the specific requirements of the scrubbing to be effected.

The floor of the scrubbing chamber 18 is formed by an inclined surface 19 conducting the deposited water toward a collector 20. The scrubbing chamber terminates in a region of narrow cross section 21 to accelerate the gases which then expand in an enlarged connection conduit 22. The conduit 22 leads to a separator 23 of the cyclone type. Water separated in the cyclone 23 is evacuated at the lower end thereof through a collector 24. The installation in addition usually includes a blower (not shown) and, depending on circumstances, complementary filtration means.

The apparatus shown in FIGS. 4 and 5 is similar to that illustrated in FIG. 3. However, in the embodiment of FIGS. 4 and 5, the gases exit from the treatment chamber 16' through exit apertures 25 located in the side walls of the chamber 16'. In FIG. 4, the side walls of certain portions of the apparatus are removed to illustrate the relative placement of the various elements.

As shown most clearly in FIG. 5, sleeves 26 connected with the apertures 25 extend into the interior of direction changing chambers 17' located on each side of the chamber 16'. Each of the chambers 17' communicates with a scrubbing chamber 18' located thereabove. The two chambers 18' are joined above the chamber 16' and communicate with a common outlet duct 27 through which escapes the scrubbed gases.

The scrubbing of the gases takes place within each of the scrubbing chambers 18' by the action of two collision jet injectors 7 at the top of the chambers 18'. The injector assemblies 7 are of the same type as described with respect to the preceding embodiments. As in the embodiment of FIG. 3, the injectors assemblies 7 are arranged so that the layer of droplets extends transversely to the gas current.

The dispersed water flows along the inclined floors 19' of the scrubbing chambers 18', running down the walls of the chambers 17' and being evacuated through the collector 20' at the lower end thereof. The sleeves 26 are downwardly inclined to prevent the water descending in the chambers 17' from entering into the treatment chamber 16'.

In some types of treatment chambers the gases are evacuated at the base of the chamber. In such case the scrubbing system can be arranged in the manner described with respect to FIGS. 1-2.

Figure 6:
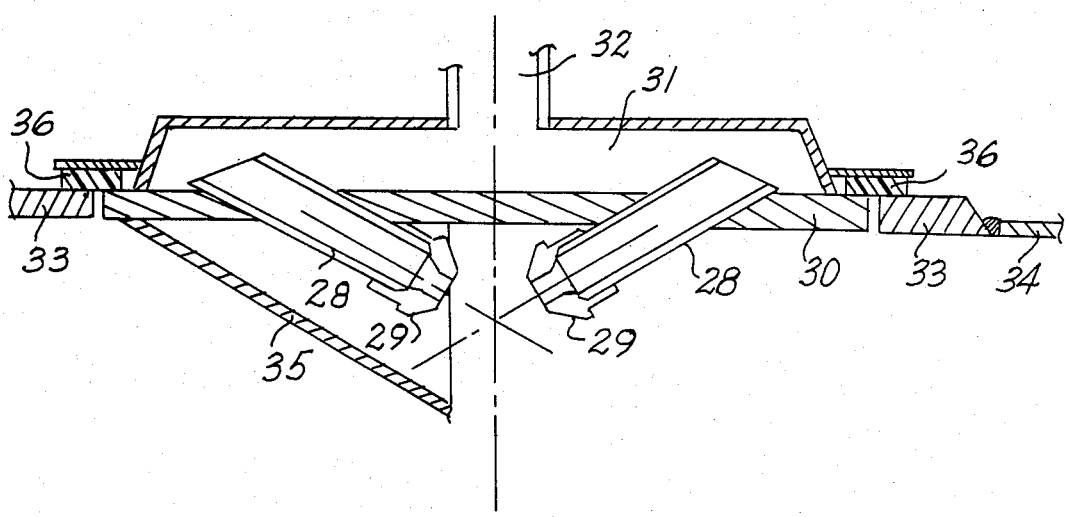
FIG. 6 is an enlarged view showing a collision jet assembly in accordance with the invention.

In FIG. 6 an injector assembly of the type described in the preceding embodiments is shown in detail. Although the assembly is shown mounted on the horizontal surface of a chamber, such as would be the case in the embodiments of FIGS. 3-5, the assembly might equally well be mounted on a vertical chamber wall such as in the embodiments of FIGS. 1-2.

The injector assembly comprises two cylindrical blast pipes 28 each of which carries on its inner end a calibrating nozzle 29 threadedly screwed thereto. The blast pipes 28 extend through and are soldered or welded to a plate 30 which forms a wall of a feed chamber 31. Water under pressure is led to the feed chamber through an inlet conduit 32. The assembly of the chamber 31, conduit 32, blast pipes 28 and nozzles 29 is arranged in a rigorously symmetrical manner so that the jets formed are identical.

The plate 30, which is substantially thicker than the walls of the chamber, is fastened onto a protection plate 33 secured to the chamber wall 34, for example, by welding. The protection plate 33 is also a thick plate since the plates 30 and 33 directly receive the impact from the portion of the water layer directed toward the chamber wall. The plate 30 and protection plate 33 accordingly protect the chamber wall from the abrasive effect of particulate matter in the water layer. A joint 36 assures a tight seal between the plates 30 and 33. The means for fastening these plates together is not shown, but may, for example, be a screwed connection.

The plate 30 supports a conical deflector 35 which, as described above, envelops one of the injector blast pipes to prevent the propagation of the opposite jet when the flow from the enveloped jet is disturbed. As described, such arrangement is particularly useful when the injector assembly is situated in the vicinity of the fiber receiving element to protect the mat being formed from a possible projection of water. Should the flow through the enveloped jet be interrupted, the jet which is not enveloped impinges against the deflector 35.

The atomization of liquids by the collision of jets has previously been used for dispersing combustible liquids in combustion chambers of engines. In such applications, the liquid output is relatively small and the dispersion is produced in a gas traveling at high speed, for example, on the order of 30 m/s. It has also been proposed to atomize water by jet collision in the neck of venturi-type apparatus, such an arrangement being intended to remove fine gas like dust from blast furnaces and the like after the latter have sustained a first washing. In such applications, the dispersion is effected in a gas maintained at a high speed flow rate and at a location where the passage cross section is narrow.

The dispersion of water by jet collision in accordance with the present invention is distinguishable from these prior applications by the environment in which the technique is used as well as by the objectives pursued and by the conditions of implementation.

In order to prevent the erosion of the chamber walls, it is preferable to limit the impact force of the jets to some degree. Control of the impact force is obtained by adjusting the form and expanse of the layer of droplets by modifying the operating conditions of the jets as described herebelow.

Several parameters determine the form and expanse of the layer of dispersed droplets. If the two jets are identical at their meeting point, that is to say, if they have the same characteristics of dimension, speed and output, the projection of the droplets is achieved in practically one plane. This plane is orthogonal to that of the jets and forms a plane of symmetry. Gravity and the gases which pass through the layer of droplets distort this plane. However, for relatively low gas speeds and relatively high jet speeds, such as those implemented according to the invention, this distortion is reduced. For practical purposes, it can be considered that the layer is planar.

In practice, it appears advantageous to have an initially planar layer which covers the largest section, the other conditions of the jets being constant. Nevertheless, it is possible to use jets of different intensities (output-speed). Layers are thus formed having the appearance of a more or less distorted paraboloid. Such an arrangement could appear advantageous when, for example, for a given output of liquid the dispersion is effected in a chamber of which the dimensions are relatively small, and when it is desirable to prevent the liquid layer from hitting the walls. In this case a deformed layer is attempted to be developed, drawn in the longitudinal direction of the chamber.

The general form of the layer was determined experimentally as a function of the angle between the two jets (see Example I herebelow). This study, made for two identical jets, shows that the layer is developed in circular form when the convergent jets are aligned, that is, form an angle of 180° between them. If the angle decreases, the layer of droplets tends to take the form of a circular sector of which the angle decreases at the same time that the angle between the jets decreases. In this last case the center of the sector corresponds to the impact point of the jets. In general use, the angle between the jets is not less than 30° and preferably ranges between 60° and 130°.

It is preferable that the atomizing apparatus not create an obstacle in the path of the gas. In other words, this apparatus is preferably close to a wall of the chamber, or of the duct, in which it is placed. Under these conditions there is a tendency toward seeking to obtain layers in the form of a sector of which the angle is close to 180° in order to cover the space up to the wall from which the atomization is effected. It can even be advantageous to form a layer of which the angle is greater than 180°, which also enables the wall on which the injector is fastened to be sprayed. Of course, if the apparatus is situated near a corner, a smaller angle of the layer could be preferable. In this case the angle of the jets is reduced to a smaller value.

The water layer is characterized by a certain thickness from the point of impact and on both sides of the initial plane. This thickness remains relatively small in relation to the other dimensions. Ordinarily it does not exceed a few tenths of centimeters. It is practically proportionate to the output and is smaller as the angle of incidence of the jets is larger.

Since the general form of the layer is mainly determined by the fact that the jets are identical and by the angle between them, the expanse of the layer is a function of the output and of the speed of the jets.

As has been seen, it is preferable to have sufficiently large layers to prevent discontinuity in the distribution. Therefore, it would appear desirable to create a single layer of dimensions such that the entire section is covered. This solution can effectively be adopted. Nevertheless, the use of a single layer is not desirable in all cases.

One reason which can lead to using several layers comes from the fact that, as was indicated above, the force of the water projection on the walls must preferably be limited. If, to cover the entire surface, a single layer was developed which virtually extended far beyond the limits of the chamber, the water would be projected on the walls with superfluous force which could be harmful to the proper operation of the apparatus.

Another reason is associated with the fact that for very large areas high yield jets should be used, which would be difficult to implement in industrial installations.

In practice, by the technique of jet collision used according to the invention, layers of droplets of 45 m² of useful area or more can easily be formed. For the reasons noted above it is preferable to form layers of which the dimensions are not the largest possible, and to make use of several injectors producing a series of cooperating layers.

The quantity of water which each pair of jets must disperse depends mainly on the section of the gaseous stream and the wall surfaces to be sprayed. For the implementation of the atomizing according to the invention the yields currently used comprise between 10 and 80 m³ per hour.

The bursting of the jets into fine droplets is a function of the collision force and therefore of the speed of the jets. The speed, itself, is a function of the pressure exerted to create the jets. In industrial installations and for significant yields, it is difficult to exceed pressures of on the order of $10^6$ Pa. (Pascals; $10^5$ Pascals=1 bar). For the dispersion and proportionment sought for implementation according to the invention, pressure of on the order of 3 to $6 \times 10^5$ Pa is satisfactory.

The size of the droplets is a function of the speed of the jets and therefore of the pressure. Experimentally, it has been determined that the higher the pressure, and consequently the greater the force of the jets, the greater the tendency is to form fine droplets. However, this variation is relatively slow. In other words, large variations in pressure only lead to a slight modification in the size of the drops. When pressure of on the order of, or greater than, $2.5-3 \times 10^5$ is used, a certain percentage of extremely fine droplets appears, that is, of which the dimensions are less than 0.01 mm. In a certain way the presence of these very fine droplets can be favorable to the scrubbing operation, particularly by assuring a very forceful contact of the water and the effluent gases; however, the subsequent removal of these droplets, before the release of the gases, can require supplementary separation operations.

The quantities of water used in tests of the invention are on the same scale as those used in conventional scrubbing apparatus. However, because of the more regular distribution of the water in the gases, these quantities can possibly be reduced.

For the atomization of water on the path of the effluent gases from installations for manufacturing fiber blankets or mats, it is ordinarily considered that a volume of water of on the order of 0.5 to 2 m$^3$ for $10^3$ m$^3$ of gas gives satisfactory results. These values are obviously not imperative. They are a function of numerous factors, and especially of the effluent gases, in particular, their binder content and the nature of the binder, their temperature, but also the quality of the water. As to the latter, it should be taken into account that it is normally recycled after a less than thorough purification. The less the recycled water is saturated, the more effective is the treatment and the less the quantity of water necessary.

The quantity of water used can also be related to the section of the chamber or of the conduit in which the dispersion is effected. Advantageously this quantity comprises between 2 and 20 m$^3$/m$^2$/hr. The output per unit of area obviously depends on the output of effluent gases passing through this area.

It seems preferable to carry out the scrubbing treatment in accordance with the invention at a point on the path of the effluent gases where the average speed of the latter is less than 10 m/s, and even less than 5 m/s. This is only a hypothesis but, it appears that when the speed of the gas is slower, and consequently the time of contact with the droplets is longer, better exchanges occur between the gases and the water dispersed.

These preferred conditions of speed are ordinarily present, particularly at the beginning of the path of the effluent gases, whether this be in the chamber placed directly downstream of the fiber receiving element, or whether this be from the emission of the effluent gases arising from other operations conducted on the fiber blanket or mat. Since it is so much more advantageous, it is preferable to effect the atomization of water as soon as possible in order to prevent the deposits which could form upstream of this atomization. The atomization by jet collision is, therefore, preferably realized just downstream of the fiber receiving surface and/or directly at the exit of the chambers for treating and conditioning the fiber blanket or mat.

While it seems preferable to proceed to the scrubbing as soon as possible on the path of the effluent gases, it can also be advantageous to repeat this scrubbing at various points on this path. In fact, even if as a result of the qualities of the scrubbing by jet collision the essential part of the pollutents present in the gases is recovered by droplets of the first layer, a certain quantity of water is carried along by the gases. This water, more abundant when the dispersion is finer, is liable to be deposited on the walls along the path. If the gas is not saturated with moisture, then deposits can be formed, certainly less than in the first part of the path, but which nevertheless can be troublesome. For this reason secondary washings can be joined with the principal washing, advantageously effected as the first by jet collision.

The water projected on the walls runs along the latter and is recovered below the chamber in which the atomizing is carried out. The atomized water entrained in the effluent gases is separated from the latter before their release into the atmosphere. Ordinarily a first separation is effected in the atomizing chamber. The largest drops, or those which are formed from several droplets, become separated from the gases without any further operation and are recovered in the lower part of the apparatus with the water running down on the walls. For the very fine droplets which are carried along by the gases a traditional method for liquid/gas separation can be used.

The water recovered is advantageously recycled. It is subjected, in advance, to the purification procedures customary in this environment. The minimum purification before recycling consists of decantation to remove at least part of the solids in suspension. Other physical or chemical methods can complete the purification treatment. In particular, a degassing of the water can be carried out. Regardless of the purification treatment(s) carried out, it is preferable that the recycled water contain no more than 4% dry matter.

In order to produce identical jets, which, as described, is the preferred case, the blast pipes and the nozzles are of identical size and shape, and the distance separating each nozzle from the point of convergence is the same for both jets.

The blast pipes of the injector, due to the power of the jets implemented, are subjected to significant forces. To rigorously maintain the geometric conditions initially defined, the blast pipes are advantageously mounted stationarily on a rigid plate. This plate also serves as protection against the erosion which can develop in the immediate vicinity of the injector when the latter, by its structure, guides a large quantity of water directly on the wall on which it is fastened.

The injector is advantageously placed near a wall of the chamber or of the duct to prevent the gas flow from being disturbed. Preferably, the injector is fastened on the wall so that only the blast pipes project into the path of the gases. It is even possible for the blast pipes to be placed in a housing, sheltered from the wall, with only the jets passing through the orifices contrived for this purpose. Depending on circumstances, one or several deflectors can be placed upstream of and close to the injector to rectify the projection of water when the operation of at least one of the jets is momentarily disturbed.

Taking into account the output conditions which were noted above, the injector nozzles according to the invention customarily have an opening greater than 8 mm and more often comprised between 8 mm and 17 mm. Under conventional installations it has been found advantageous to place an injector assembly thereabouts for each surface cross section of 2.5 m².

EXAMPLE 1

The configuration of the atomized layers of water was studied in preliminary tests.

A series of measurements of the opening angle of the layer having the form of a circular sector were thus established as a function of the angle between the two identical jets.

These measured values are the following:

| angle between the jets | 30° | 60° | 90° | 100° | 108° | 120° |
|---|---|---|---|---|---|---|
| opening angle of the layer | 40° | 80° | 120° | 150° | 180° | 210° |

The output values obtained for nozzles of 16 mm and $8.10^5$ Pa reach 50 m³/hr.

For nozzles of 16 mm and a pressure of about $6.10^5$ Pa, at an angle of 120°, the layer of droplets formed is greater than 90 m².

EXAMPLE 2

The scrubbing according to the invention is carried out in a scrubbing chamber and in the adjacent chamber, downstream of the fiber receiving conveyor of an installation for forming a fiber blanket or mat.

Previously, 13 conventional spoon or spatula-like atomizing elements had been utilized in the washing chamber and 16 in the adjacent chamber.

These elements are replaced by 2 collision jet injectors on the opposite walls of the scrubbing chamber directly below the conveyor (75 cm below the latter) and two in the adjacent chamber which, by means of ducts, lead the gases toward a cyclone.

The cross section of the scrubbing chamber under the conveyor is about 7.5 m².

The quantity of gas passing through the scrubbing chamber is about $54.10^3$ m³/hr.

The injectors placed in the scrubbing chamber have nozzles of 16 mm in diameter; those of the injectors placed in the adjacent chamber are of 11 mm in diameter.

The water pressure is $5.10^5$ Pa.

The jets are directed toward each other following an angle of 120°.

The water used is recycled water which contains on the order of 2.5% by weight of dry matter.

In the scrubbing chamber the output measured is about 36 m³/hr. for each injector. It is 18 m³/hr. for each injector in the adjacent chamber, therefore, a total of about 108 m³/hr.; that is to say, a quantity comparable to that previously used with the conventional atomizers.

No difficulties appeared during the course of a year of continuous operation. No interruption of operation was necessary. The injectors never became obstructed. The wear of the nozzles was negligable. For the diameter, it was less than a tenth of a millimeter.

The walls of the scrubbing chamber, the adjacent chamber, and the ducts were perfectly clean.

EXAMPLE 3

Following the test results obtained and reported in Example 2, two entire production lines of fiber mat were equipped with a system for scrubbing by jet collision.

On a line comprising 8 centrifuge fiberizing units producing a total of about 140 tons of fiber per day, the reception of the effluent gases under the conveyor belt is assured by four scrubbing chambers.

The total volume of gas passing through these scrubbing chambers is of on the order of $288.10^3$ m³/hr.

18 collision jet injectors are placed in the scrubbing chambers and in the adjacent chambers.

The 18 injectors are identical. The angle of the jets is 120°. The diameter of the nozzles is 13 mm and the water pressure $5.10^5$ Pa. Each injector yields about 26 m³/hr., a total of 468 m³/hr.

These 18 injectors were introduced into this installation as a replacement for 139 spoon-like atomizing apparatus.

After more than 6 months of continuous operation, an examination of the installation showed the total cleanliness of the entire circuit taken by the gases, particularly the scrubbing chambers, the ducts, the cyclone separators and the blowers. With the previous conventional scrubbing means, systematic stoppages were necessary about every six weeks.

I claim:

1. A process for the manufacture of mineral fiber material comprising the steps of attenuating mineral fibers; coating the fibers with a finely divided liquid binder composition; entraining the coated fibers in a downwardly directed gaseous current in a forming hood having a foraminous conveyor in a lower region thereof movable transversely across the fiber-laden current; collecting fibers in the form of a blanket on the conveyor; directing the gaseous current passing through the conveyor into a gas receiving chamber below the conveyor having a width substantially equal to the width of the conveyor; providing a plurality of pairs of convergent jets of a scrubbing liquid in said gas receiving chamber to produce a substantially planar sheet of atomized scrubbing liquid coextensive with the cross-sectional area of said gas receiving chamber and disposed immediately beneath said conveyor and parallel thereto to intercept the gaseous current flowing downwardly therethrough; and accelerating the flow of the gaseous current following its passage through the atomized scrubbing liquid by directing said current into an off-take passage having a cross-sectional flow area substantially smaller than that of said gas receiving chamber.

2. A process according to claim 1, characterized in that the jets are arranged so that the layer of water dispersed extends transversely to the path of the gases.

3. A process according to claim 2, characterized in that the jet collision is produced between pairs of identical jets to develop a substantially planar layer of droplets.

4. A process according to claim 1, characterized in that the water dispersion is effected on the gases flowing at an average speed of less than 10 m/s.

5. A process according to claim 1, characterized in that the quantity of water dispersed comprises between 0.5 and 2 m³ of water for a volume of gas of $10^3$ m³.

6. A process according to claim 3, characterized in that the output of water for a pair of convergent jets comprises between 10 and 80 m³/hr.

7. A processs according to claim 3, characterized in that the angle between the jets of each pair is greater than 30°.

8. A process according to claim 7, characterized in that the angle of the jets comprises between 80° and 130°.

9. A process according to claim 1, characterized in that the water dispersed is conducted at a pressure comprising between 3 and $6.10^5$ Pa.

10. A process according to claim 1, characterized in that the output of water dispersed per unit of sectional area and per hour comprises between 2 and 20 m$^3$/hr. m$^2$.

11. A process according to claim 1, characterized in that the dispersed water is next separated from the gases and is treated to remove at least a portion of the products with which the water is saturated from contact with the gases and the walls of the chamber, and that the water is re-used for a new washing operation.

12. A process according to claim 11, characterized in that the water separated from the gases is filtered to remove at least a portion of the solid products entrained, the re-used water containing no more than 4% dry matter.

13. Apparatus for manufacturing mineral fiber blanket comprising means for attenuating mineral fibers, means for developing a downwardly directed gaseous current with the attenuated fibers entrained therein, a forming hood for receiving the fiber-laden current and having side walls in upright planes at opposite sides of the current and also having spaced end walls, a foraminous conveyor movable in a path in the lower region of the hood between said side walls in position to move transversely across the fiber-laden current and thereby collect fibers in the form of a blanket moving with the conveyor while permitting the gas of the current to flow through the conveyor, gas receiving chamber means below the conveyor and having a gas flow area of width substantially equal to the width of the forming hood, a gas flow off-take passage communicating with the gas receiving chamber means in a region spaced below the conveyor and of small cross-sectional flow area as compared with that of the receiving chamber means, and mechanism for subjecting the gas of said current to liquid scrubbing action after passage through the foraminous conveyor and before entry into said region of small cross-sectional flow area, said mechanism comprising a plurality of pairs of blast pipes for delivering a scrubbing liquid, the pairs of pipes being mounted in the receiving chamber at a level spaced above said gas flow off-take passage, the blast pipes of each pair being positioned adjacent to a boundary wall of the gas receiving chamber means and being directed at an angle toward each other substantially in a common upright plane perpendicular to the adjoining wall of the gas receiving chamber means, said plurality of pairs of blast pipes being positioned to produce an atomized sheet of the scrubbing liquid extended across the gas receiving chamber means in a plane extended substantially throughout the area of the underside of the foraminous conveyor exposed to the gas receiving chamber means.

14. An apparatus according to claim 13, characterized in that the extremities of the blast pipes bear nozzles calibrating the jets, and in that the blast pipes and the nozzles have a circular cross section.

15. An apparatus according to claim 14, characterized in that the blast pipes and the nozzles of a same pair are of identical size and shape, their axes are convergent, and the distances separating the orifice of each nozzle from the point of convergence of the axes are equal.

16. An apparatus according to claim 14, characterized in that the blast pipes are mounted on a plate fastened on a wall of the chamber, only the blast pipes and the nozzles projecting through the wall into the interior of the chamber.

17. An apparatus according to claim 14, characterized in that the blast pipes and the nozzles are situated adjacent the surface of the wall so as not to form an obstacle to the path of the gases.

18. An apparatus according to claim 16, including a deflector disposed upstream of the injection blast pipes to form an obstacle to the accidental projection of water countercurrent to the gases.

19. An apparatus according to claim 14, characterized in that the blast pipe nozzles have an orifice diameter greater than 8 mm.

20. An apparatus according to claim 13, characterized in that a separating system is provided downstream of the region of small cross-sectional flow area to remove liquid entrained by the gases.

21. An apparatus according to claim 20, characterized in that the separating system comprises a cyclone.

* * * * *